UNITED STATES PATENT OFFICE.

ERNEST HOPKINSON, OF NEW YORK, N. Y.

METHOD OF MAKING CASINGS OF PNEUMATIC TIRES FOR VEHICLES.

1,289,771.  Specification of Letters Patent.  Patented Dec. 31, 1918.

No Drawing.  Application filed January 31, 1918.  Serial No. 214,611.

*To all whom it may concern:*

Be it known that I, ERNEST HOPKINSON, a citizen of the United States, residing in New York city, county and State of New York, have invented a certain new and useful Method of Making Casings of Pneumatic Tires for Vehicles, of which the following is a full, clear, and exact description.

This invention relates more particularly to a method of making tire casings in which is employed a fluid under pressure applied directly to the interior wall of the casing for supporting it during the vulcanizing treatment or for stretching or tensioning the threads or cords composing the plies of the casing to bring them to tire formation prior to vulcanization.

It has been previously suggested to subject the interior of a tire casing, either previous to or during vulcanization, to the action of a fluid directly applied to the casing for the purpose of giving the tire either partial or complete tire formation or to maintain the formation during vulcanization. I have found however that in all such attempts where the fabric plies composing the carcass are resisting the forming and stretching action of the fluid pressure to such an extent as would cause the casing to return to or partially to its original form if the pressure were removed, that the fluid acts detrimentally upon the unvulcanized rubber and fiber composing the plies with the result that the rubber is displaced and the fluid permitted to enter between the plies of fabric, thereby causing separation of the plies, blowing of the rubber, blisters, etc., in the final product and completely failing to accomplish the object desired. I attribute this, in part at least, to the fact that the rubber component of the casing before vulcanization does not offer the same resistance to the pressure of the fluid as does the fabric. Accordingly, the rubber is forced forward by the pressure of the fluid in advance of the fabric, that is to say, the rubber is forced through the interstices of the fabric and the fluid is thus permitted to enter the interstices and forces itself between the plies and into the rubber with the disastrous results above mentioned.

In building the plies composing the carcass, the threads, cords, or woven fabric composing the plies are generally treated with the rubber in a manner to fill the interstices between the fibrous elements and to coat the plies on both sides with a continuous sheet of the unvulcanized rubber compound so that the fibrous elements are completely sheathed. It is difficult to determine whether the fluid pressure above referred to, acting upon the unvulcanized interior wall of the casing, severs the bond between the fiber and the adjacent coating of rubber, or whether the bridge of rubber filling the interstices connecting the fibrous elements is disrupted, or whether both these results occur. Whether it be one or the other or both will depend to some extent at least upon the nature of the rubber compound and the manner of producing the bond between the rubber and fibrous elements. In any event the rupture often begins at the innermost ply and I have found that if the interior surface can be rendered impermeable to the fluid when under the required pressure that the casing may be stretched and shaped at will and held in its stretched or reformed condition during vulcanization without encountering the injurious results above mentioned.

In my co-pending application, Serial No. 212,517, I have disclosed a method whereby the casing, after it has been stretched and brought to final or approximately final tire shape, may be set in this shape to a sufficient degree to prevent the undesirable returning to original form, and thereby attain a condition which will permit of the desired direct application of the fluid pressure to the interior of the casing during the final cure without the ill effects that have heretofore followed such a treatment. My present invention is directed toward attaining the same ends and I believe I am the first to successfully vulcanize a tire casing in direct contact internally with a fluid under pressure. The present invention is however further directed to bringing the casing up to tire shape by the direct application of a fluid under pressure to the interior wall of the casing, a result which previous to this invention has never been successfully attained as far as I am aware.

My invention viewed from its broadest aspect resides in rendering a layer or stratum of the casing impervious to the fluid when subjected to the desired pressure by increasing its tenacity, and in the preferred form the interior surface of the casing is so treated that it forms a barrier to the fluid preventing it from entering the body of the casing not only during the vulcanizing treatment but also during the stretching and tensioning of the casing to bring it to tire shape.

I have discovered that this result can be satisfactorily attained if the interior surface of rubber be sufficiently set by partial vulcanization. In this condition it will offer the required resistance to form a barrier to the fluid pressure while at the same time permitting the casing to be stretched and formed to the required extent and finally vulcanized. Moreover I have found that during final vulcanization this partially vulcanized stratum will be finally vulcanized with the remainder of the tire to form a unitary vulcanized structure and in such structure will sustain its full share of the total strain to which the carcass is subjected.

Direct fluid pressure has been applied to the interior of a casing to give it tire shape in several widely different ways; for instance, a tire has been built upon a core or form and then attempts made to blow it or expand it from the form against confining mold walls by means of fluid pressure introduced directly between the form and inner wall of the casing, the form being perforated for this purpose. In other instances, the core has been entirely removed and an inflatable tube or air bag inserted in its place and inflated to expand the casing against the walls of the confining mold. In still other instances, the casing has been first formed in the shape of a flat pulley band and then brought to tire shape by subjecting it interiorly to the pressure of an inflated tube or air bag simultaneously with the moving together of the margins of the band to form the beads of the casing as set forth in my above mentioned co-pending application. In all instances however, the carcass is composed of several plies of fibrous material which may be formed and assembled in various ways; for instance, the carcass may be composed of thread fabric or woven fabric or of cords, and each ply may be formed separate from the others, or they may be formed together of a continuous spiral winding extending longitudinally around the tire, or where made of cords, bands or tapes, this material may be wound transversely to and fro from bead to bead.

In the preferred manner of practising my method, I subject the inner ply to a partial vulcanization and this is preferably carried out before it is built into the carcass, that is to say, before the other plies are superimposed thereupon. This ply may receive its partial cure while in a flat state or after it has been formed as a continuous band. It may also receive its partial cure while supported on the drum or core or other form upon which the other plies will be later assembled, or upon an auxiliary support from which it may be transferred to a subsequent support after it has received the partial vulcanization. Where the tire is formed of continuous plies wound spirally about the form longitudinally, it is desirable to semi-cure the first ply before the other plies are superimposed thereon, precautionary measures being taken to prevent the vulcanizing medium affecting the material that will form the subsequent plies.

My invention is not limited however to setting or partially vulcanizing the inner ply in any particular manner for it may be vulcanized after the entire casing has been formed or at any stage of its formation. In such instances, the vulcanizing treatment is preferably effected by a medium applied directly to the interior of the casing. For instance, the support for the casing may be made of metal and heated in any desired manner to give the required partial vulcanization to the surface immediately in contact therewith.

The fiber and rubber of the inner ply may be associated in any desired manner, but I prefer to provide the usual skin coat on the interior of the ply which may in some instances be slightly thicker than that ordinarily used in order to insure a safe margin of resistance to the fluid pressure when later applied.

After the casing with the partially vulcanized interior surface has been completed to the required stage, which may include the assemblage of all the parts necessary to compose a tire on any part thereof, it may then be subjected to the direct action of the interiorly applied fluid pressure for any of the before mentioned purposes. For instance, the casing or any portion thereof, built to flat pulley band formation, may be stretched and formed to tire shape and then finally vulcanized while in tire shape by the direct application of fluid to the interior thereof and supported in final shape by the pressure of the fluid. Or if the tire has been originally formed to partial shape, as by building it on a core or form, the fluid pressure may be exerted directly between the core or form and the inner walls of the casing and the tire brought thus to final shape; or the core may be removed entirely and the fluid introduced in its place to stretch the tire to final shape and maintain it thus during the vulcanizing treatment.

When I use the word casing in the claims it will be understood that this word means either the complete casing with the tread rubber applied or only the carcass.

Having thus described my invention, what I claim as new and desire to protect by Letters Patent is:

1. A method which comprises producing a tire casing in the absence of fluid pressure in direct contact with the inner surface, having the major portion of its rubber component unvulcanized and a stratum of said rubber component of increased tenacity rendering it impervious to fluid under a predetermined pressure, subsequently thereto giving the casing tire shape by subjecting the interior to the direct action of a fluid pressure, and finally vulcanizing the casing.

2. A method which comprises producing a tire casing in the absence of fluid pressure in direct contact with the inner surface, having the major portion of its rubber component unvulcanized and a stratum of said rubber component forming the interior surface of increased tenacity rendering it impervious to fluid under a predetermined pressure, subsequently thereto giving the casing tire shape by subjecting the said surface to the direct action of a fluid pressure, and finally vulcanizing the casing.

3. A method which comprises producing a tire casing in the absence of fluid pressure in direct contact with the inner surface, having the major portion of its rubber component unvulcanized and a partially vulcanized stratum, subsequently thereto subjecting the interior of the casing to the direct action of fluid pressure, and finally vulcanizing the casing.

4. A method which comprises producing a tire casing in the absence of fluid pressure in direct contact with the inner surface, having the major portion of its rubber component unvulcanized and a partially vulcanized stratum forming the interior surface, subsequently thereto subjecting the said casing to the direct action of fluid pressure, and finally vulcanizing the casing.

5. A method which comprises producing a tire casing in the absence of fluid pressure in direct contact with the inner surface, of plies of fibrous material and rubber having the major portion of its rubber component unvulcanized and one of the plies partially vulcanized, subsequently thereto subjecting the interior of the casing to the direct action of a fluid pressure, and finally vulcanizing the casing.

6. The method of making a pneumatic tire casing which comprises partially vulcanizing a ply made of rubber and fibrous material, incorporating said ply and unvulcanized plies in the casing, subjecting the said casing to the direct action of a fluid pressure applied to the interior surface thereof, and finally vulcanizing the casing.

7. A method which comprises producing a tire casing in the absence of fluid pressure in direct contact with the inner surface, having the major portion of its rubber component unvulcanized and a stratum of said rubber component of increased tenacity rendering it impervious to fluid under a predetermined pressure, subsequently thereto giving the casing tire shape by subjecting the interior to the direct action of a fluid pressure, and finally vulcanizing the casing while maintaining a fluid pressure in direct contact with the interior surface thereof.

8. A method which comprises producing a tire casing in the absence of fluid pressure in direct contact with the inner surface, having the major portion of its rubber component unvulcanized and a partially vulcanized stratum, subsequently thereto giving the casing tire shape by subjecting the interior to the direct action of a fluid pressure, and finally vulcanizing the casing.

9. A method which comprises producing a tire casing in the absence of fluid pressure in direct contact with the inner surface, having the major portion of its rubber component unvulcanized and a partially vulcanized stratum, subsequently thereto giving the casing tire shape by subjecting the interior to the direct action of a fluid pressure, and finally vulcanizing the casing while maintaining a fluid pressure in direct contact with the interior surface thereof.

10. A method which comprises producing a tire casing in the absence of fluid pressure in direct contact with the inner surface, having the major portion of its rubber component unvulcanized and a partially vulcanized stratum, subsequently thereto subjecting the interior of the casing to the direct action of fluid pressure, and while under a fluid pressure finally vulcanizing the casing.

11. A method which comprises producing a tire casing in the absence of fluid pressure in direct contact with the inner surface, having the major portion of its rubber component unvulcanized and a stratum of said rubber component of increased tenacity rendering it impervious to fluid under a predetermined pressure, supporting the casing thus produced upon a rigid support, subsequently thereto subjecting the interior of the casing to the direct application of fluid pressure to bring said casing to tire shape, and while under a fluid pressure finally vulcanizing the casing.

12. The method of making a pneumatic tire casing which comprises rendering a stratum of the rubber and fibrous plies of which the carcass is comprised inherently impervious to fluid under a predetermined pressure in the absence of fluid pressure in direct contact with the inner surface and assembling the rubber and fibrous plies under substantially uniform tension to form the carcass while maintaining the major portion of its rubber component unvulcanized, subsequently thereto subjecting the interior of the carcass to the direct action of a fluid pressure, and finally vulcanizing the carcass.

13. A method which comprises producing a tire casing of plies of fibrous material and rubber in the absence of fluid pressure in direct contact with the inner surface, having the major portion of its rubber component unvulcanized and one of the plies partially vulcanized, subsequently thereto subjecting each of the plies composing the carcass to a substantially uniform tensioning by the direct application of fluid pressure, and finally vulcanizing the carcass.

14. A method which comprises producing a tire casing in the absence of fluid pressure in direct contact with the inner surface, having the major portion of its rubber component unvulcanized and a stratum of said rubber component of increased tenacity rendering it impervious to fluid under a predetermined pressure, subsequently thereto subjecting the interior of the carcass to the direct action of fluid pressure, and finally vulcanizing the carcass.

15. A method which comprises producing a tire casing of plies of fibrous material and rubber in the absence of fluid pressure in direct contact with the inner surface, having the major portion of its rubber component unvulcanized and the adhesion between the rubber and fiber of one of the plies increased, subsequently thereto subjecting the interior of the carcass to the direct action of fluid pressure, and finally vulcanizing the carcass.

Signed at New York, New York, this 30th day of January, 1918.

ERNEST HOPKINSON.